Sept. 8, 1970        J. W. OEHRLI        3,527,122

SAW TOOTH SHARPENER FOR SAW CHAIN AND OTHER SAWS

Filed July 9, 1968        2 Sheets-Sheet 1

JOHN W. OEHRLI
INVENTOR.

BY
ATTORNEY

JOHN W. OEHRLI
INVENTOR.

BY

ATTORNEY

United States Patent Office 3,527,122
Patented Sept. 8, 1970

3,527,122
SAW TOOTH SHARPENER FOR SAW CHAIN AND OTHER SAWS
John W. Oehrli, 251 Tranquillo Road,
Pacific Palisades, Calif. 90272
Filed July 9, 1968, Ser. No. 743,348
Int. Cl. B23d 63/12
U.S. Cl. 76—37                                     15 Claims

ABSTRACT OF THE DISCLOSURE

A saw tooth sharpener comprising a gear with abrasive teeth adapted to mesh and run with the teeth of saw chain, the abrasive gear teeth moving across the front cutting edge of successive saw teeth as the gear and saw teeth run in mesh.

FIELD OF THE INVENTION

This invention relates generally to sharpeners for saw chain.

BACKGROUND OF THE INVENTION

The cutters of saw chain were initially sharpened by filing, which, however, is time consuming, slow, and suffers from the problem of uniformity of sharpening. Chain saws have been equipped in the past with sharpeners of various types, capable of sharpening the top edges of certain saw chain cutters, but these have not been capable of sharpening front cutting edges of cutter teeth such as used on side cutters and rakers of scratcher chain. The purpose of the present invention is the provision of a sharpener capable of effectively sharpening the front cutting edges of saw teeth on saw chain, such as the side cutters and rakers on scratcher chain.

BRIEF SUMMARY OF THE INVENTION

The invention provides a gear having teeth pitched and formed to mesh and run with the cutter teeth on the saw chain, the gear teeth engaging and sliding on the front cutting edges of the chain teeth. The teeth are thereby sharpened, and the contour imparted to the cutting edges of the saw teeth depends upon the profile of the gear teeth, which may be designed as desired. For example by use of a cycloidal gear tooth profile on the gear teeth, a straight up and down cutting edge can be formed on the cutter; and modifications may be introduced as desired.

BRIEF DESCRIPTION OF THE DRAWINGS

Reference is now directed to the drawings, showing certain present illustrative embodiments of the invention, and in which.

DESCRIPTION OF A PREFERRED EMBODIMENT

Figure 1:
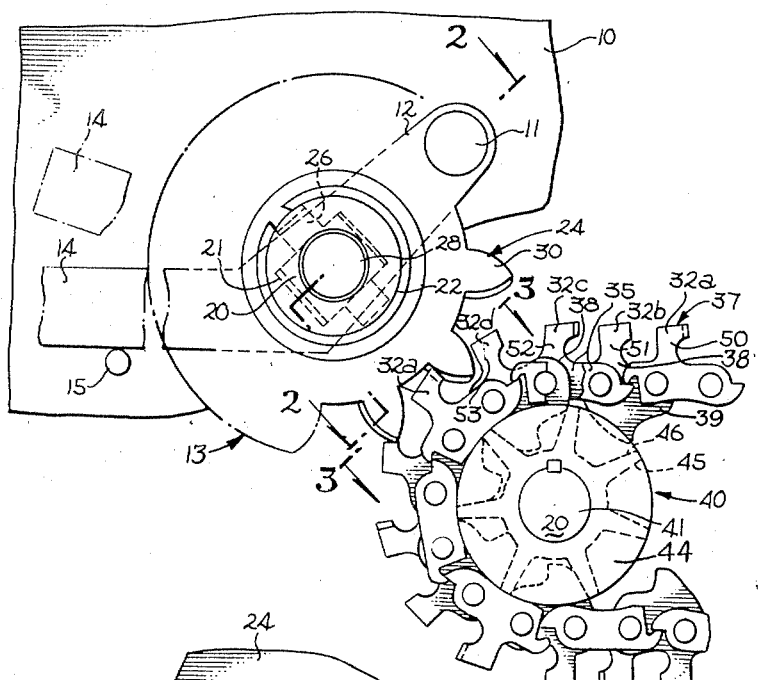
FIG. 1 is a side elevational view of an illustrative saw chain in its path around a drive sprocket, and a sharpener in accordance with the invention being used therewith.

Referring now first to FIGS. 1–4 of the drawings, and particularly to FIG. 1, numeral 10 designates generally a fragmentary portion of the frame of a chain saw, or chain saw engine. Pivotally connected to frame 10, at 11, is a mounting arm 12 for the sharpener, generally designated at 13. The handle may be held in the retracted position by a spring, catch, or any other suitable device, not shown.

Arm 12 has at its extremity a handle 14 by which it may be moved between an operative sharpening position (FIG. 1 in full lines), fixed by a stop 15 understood to be set into frame 10, and a retracted position, suggested by the phantom line position of the handle in FIG. 1.

Projecting from arm 12 is a square stem 20, which is received, with clearance, in a square socket 21 formed in one side of a cylindrical bearing 22. Bushings 23 on bearing member 22 journal a forming gear 24. A pin 26 through bearing 22 and the stem 20 affords the gear 24 a trunnion mounting on the arm 12. A handle 28 projecting from bearing member 22 can be oscillated manually to impart a small angular oscillation to the gear 24 about a diametrical axis thereof. (See the full and phantom line positions in FIG. 2.)

The gear 24 has cycloidal teeth 30, which in this case have their root circle a short distance below the pitch circle of the gear, only the tooth faces of these teeth having utilized. And as will be seen shortly, the saw teeth 32a to 32d, which are to mesh with the tooth faces of the gear teeth 30, terminate at their pitch circle, and thus, considered as gear teeth, comprise the dedendum only, or tooth flank, of an ordinary gear.

The illustrative saw chain 34 to be sharpened is, excepting for a certain control device which will be mentioned, of a common so-called scratcher type that will be readily recognized, comprising pairs of side links 35, connected by front and rear pivots 36 and 37 to the rear and front pivot points, respectively, of intervening center links 38. The center links 38 have conventional drive roots 39, and the chain 34 is shown as going around a conventional rim sprocket 40 on a shaft 41 driven from the saw chain engine. The sprocket will be understood to comprise spaced circular rims 44 for supporting side links 35, between which are alternate sprocket teeth 45 and root receiving pockets 46.

The saw teeth of the illustrative chain 34 comprise, in repeating sequence, a righthand side cutter 32a, on an outwardly offset shank 50 rising from the righthand side link 35 (as viewed in the direction of travel of the chain), a righthand raker 32b on a shank 51 rising from the following center link 38, and offset somewhat to the right, a lefthand side cutter 32c, on an outwardly offset shank 52 rising from the next following lefthand side link 35, and a lefthand raker 32d on a shank 53 rising from the following center link 38. The teeth 32a to 32d are generally rectangular, elongated in the longitudinal direction of the chain, slightly rearwardly and downwardly sloping on top to afford a clearance angle. The teeth have generally vertical front edges, and these may be formed with either zero, positive, or negative rake angles. These front edges are preferably close to a perpendicular bisector of the center line of the link determined by the centers of the two pivots of the link. The lower ends of the front cutting edges are connected to the links by gullets 58.

The front edges 60 of the side cutters are beveled to their outer surfaces, as at 61, to provide front or leading knife edges 62, and the tops of the side cutters may also be beveled to their outer surfaces, as in some cases in the prior art, but I prefer to omit this top bevel, and the cutters are shown without it in the drawings. As will be understood, in saw chains of this type, the side cutters sweep along paths partially outside the margins of the chain, and function to cut side grooves in the kerf, while the rakers operate side-by-side, and just inside the side cutters, to cut away the kerf between the two side grooves. The rakers, as usual, are of slightly less height than the side cutters; and the leading knife edges of the side cutters project somewhat further forwardly with respect to the perpendicular bisector of the center line of the link than do the leading edges of the rakers. The reason for this feature will become apparent presently.

The side links are shown in the drawings with an optional but preferred feature which is the subject matter of my copending application entitled "Saw Chain," Ser. No. 743,843, filed July 10, 1968. The purpose of this feature, which is presently to be described, is to hold the cutters on the side links down on the saw bar, against a tendency to tilt upwardly about their rear pivots upon encountering the kerf, and also to prevent these links from tilting outwardly about their rear pivots while going around the drive sprocket. These accomplishments are of particular importance in connection with the present invention in view of the fact that the cutters are thereby held in their proper, predetermined positions while being operated upon by the sharpener, thus assuring sharpening at the precisely correct angle.

Figure 5:
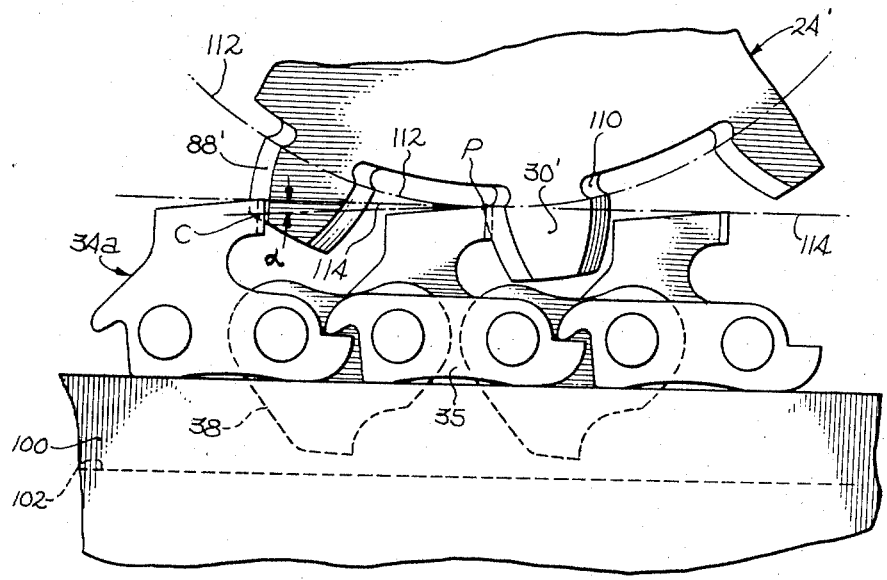
FIG. 5 is a side elevational view of a fragmentary portion of an illustrative saw chain travelling a rectilinear path, in operative association with the sharpener of the present invention.

As shown in the drawings, the leading portion 76 of each side link 35 has a toe 77, the upper surface or flank 78 of which substantially coincides with the center line of the link. A toe 79 on the trailing end portion of the immediately preceding side link 35 extends angularly down into the notch 80 formed between flank 78 and surface 81 on the front end of the following link 35, so that its tip engages the toe 76 at the base of flank 78 when the links are rectilinearly aligned; and when the links 35 are angularly disposed relative to one another, as they are on the sprocket as seen in the drawings, the tip of the toe 79 moves outwardly along the flank 78 of the toe 77, as clearly shown. In the latter position, the toe 79 holds down the following link 35 by engagement of its tip with the outer end portion of the toe flank 78 so that the links, and the cutters thereon, are held against outward tilting or other erratic motion while going about the sprocket. In the rectilinearly aligned position, as when traversing a saw bar, not shown, the top of the toe 79 on the trailing end portion of the preceding link holds down the forward end portion of the following link by engaging the toe flank 78 near the base of the latter. Such a position is shown in FIG. 5. The importance in thus holding the side links and the cutters thereon in a precisely predetermined path during sharpening of their edges should be evident.

Figure 1A:
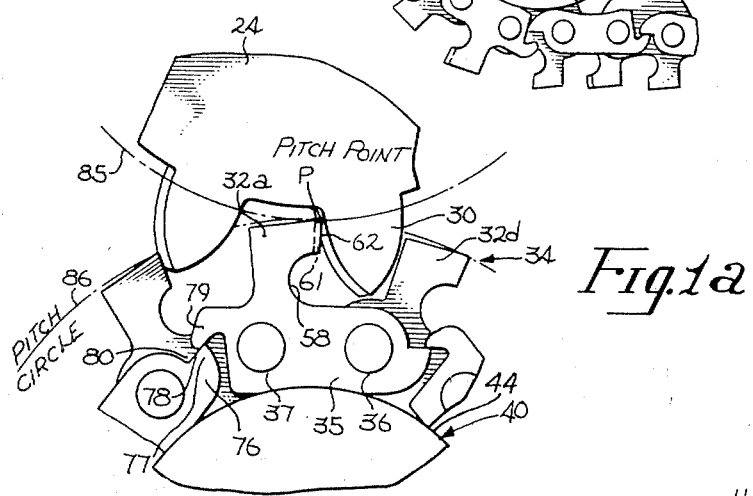
FIG. 1a is a fragmentary enlarged detail view taken from FIG. 1.

Referring now particularly to FIGS. 1 and 1a, it will be seen that the gear teeth 30 of the spur gear 24 and the cutters 32a and 32d etc. of the saw chain mesh with one another. The process of the invention is to run the two together, using the cutters as though they were the teeth of a driving gear, and by the ensuing rubbing contact, to cause the cutters to be sharpened by the gear teeth. To this end, the gear teeth may be harder than the cutters, so as to be capable of abrading the latter, and thus sharpening and honing them. The abrading function may also be accomplished by use of an abrasive gear, such as is commonly used in honing of gear teeth, and for this purpose the gear may comprise a binder such as an epoxy, with various fine abrasive particles therein, such as oxides or carbides; or the gear may be composed of steel, with a carbide sprayed thereon. As a still further alternative, I may use, on the surface of the gear teeth, an abrasive-bearing lubricant. In all cases, the gear teeth have an abrading action on the cutters, and may broadly be described as abrasive.

The gear teeth, and the cutters 32a etc. going around the sprocket rim, have the same circular pitch and, as indicated in the drawings, a substantial backlash distance may be provided. As with any pair of properly working gears, the pitch circle 85 of gear 24, and the pitch circle 86 of the cutters 32a etc. travelling about the axis O of sprocket 44, are tangent to one another at the pitch point P. It will be noticed that the tooth faces 88 of the gear teeth 30, i.e., the portions of the teeth outside the pitch circle, are used to work against the leading edges of the cutters 32a to 32d which are in effect the teeth of the "gear" constituted by the chain going about the rim sprocket 44. The usual gear tooth flanks thus not being utilized, the dedendums or roots of the teeth 30 may be very short, as shown. On the contrary, the leading cutting edges of the cutter teeth 32a etc. are entirely inside their pitch line or circle 86, and these edges accordingly represent the dedendums of the gear constituted by the chain going around the rim sprocket.

The tooth faces 88 may be ground with various gear shapes, but if these faces are generated by cycloidal curves, as I prefer, and as here represented, the leading or cutting edges on the saw chain teeth or cutters 32a etc. will be sharpened on straight lines radial with respect to the sprocket axis O, provided also that these leading edges are at or on the perpendicular bisector of the center line of the link determined by the pivots 36 and 37. If the leading cutting edges of the cutters are forward of this perpendicular bisector, they will reach the grinding position early, relative to the angular position of the link, and hence be sharpened with a positive back rake ankle; and if rearward thereof, they will reach the grinding position late, and hence be sharpened with a negative back rake angle. It is within the scope of the invention to sharpen the cutting edges vertically (zero rake) or with either positive or negative rake.

As shown in FIGS. 1 and 1a, one tooth 30 of the gear 24 has just entered into engagement with the leading edge of a chain cutter, while the preceding tooth of the gear is in engagement with the preceding cutter tooth at its pitch circle, and is on the point of separation from this cutter tooth. As shown, therefore, there is a small overlap, in that two gear teeth will always be in engagement with two cutter teeth. It will also be clear that the cutter tooth makes initial contact near its tip with the outer extremity of the tooth face on a gear 30, and the cutter tooth edge then rubs on the gear tooth face from the extremity of the latter down to the pitch circle, after which the cutter and gear tooth clear one another. In this rubbing contact, because of the abrasive action of the gear tooth on the cutter, the cutter edge is sharpened and honed to a shape governed by the profile of the tooth face. As described hereinabove, assuming a cycloidal gear face, the shape so imparted to the cutter edge will be a straight line, and can be canted in either direction, if desired, or set straight up and down, depending upon the location of the leading edge of the cutter with reference to the perpendicular bisector of the center line of the cutter carrying link. It will further be understood that the contour of the cutting edge ground and sharpened onto the cutters is governed by the profile of the sharpening face of the gear tooth 30, and that this profile may be cycloidal, as preferred, or any other found desirable or useful.

Figure 2:
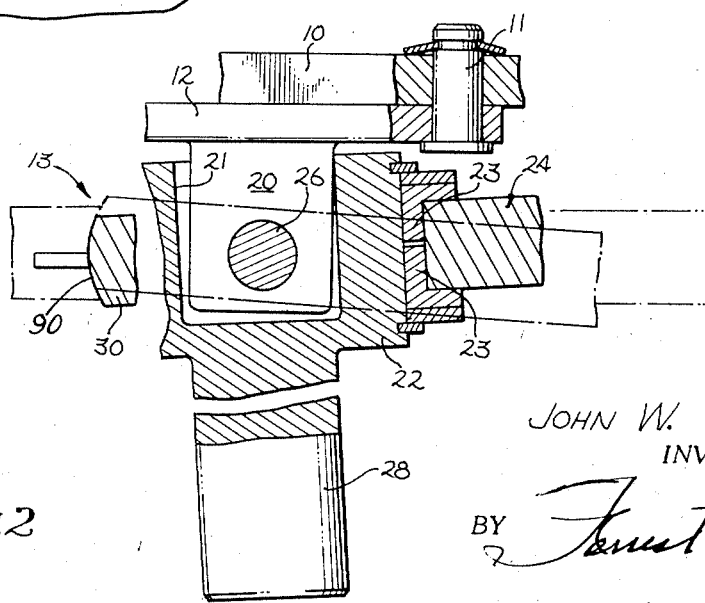
FIG. 2 is a section taken on the broken line 2—2 of FIG. 1.
Figure 3:
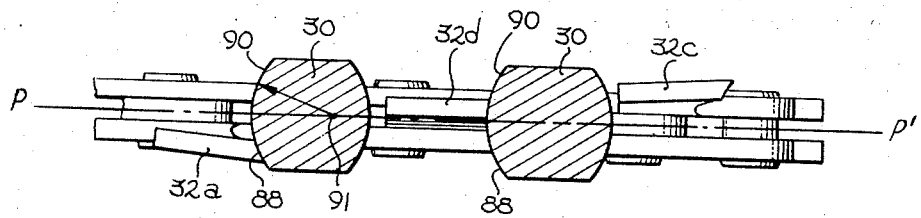
FIG. 3 is a somewhat diagrammatic section taken substantially in accordance with the line 3—3 of FIG. 1, the views being actually shown as though the arcs of the pitch circles of the sharpener teeth and cutter teeth were straightened into coinciding flat planes.

Recalling now that the several cutters 32a–32d comprising each repetitive cutter sequence are in different planes, and that it is desired to grind or sharpen the leading edges of the side cutters 34a– and 34c with bevels, but not the leading edges of the rakers, the gear teeth 30 are profiled with a crowned tooth face, as indicated at 90 in FIGS. 2 and 3. This crown 90 may be on an arc centered at the point 91 as seen in FIG. 3, said point being in the longitudinal medial plane p–p', of the gear tooth and being located within the tooth in a position such as illustrated in FIG. 3. In FIG. 3, at the left, can be seen a righthand side cutter 32a, with its bevelled leading edge in engagement with a laterally outward region of the crowned tooth face 88, where a slightly concave "bevel"

will be ground on the cutter 32a. The preceding lefthand side cutter 32d, which will be understood to have just separated from a corresponding but opposite position on the profile of the tooth face 88, is shown to have an opposite slightly concave bevel formed thereon by its engagement with the gear tooth.

The central or medial region of the crowned tooth face 88, as seen in FIG. 3, is shown to be in engagement with a raker cutter 32d, and it will be seen that this cutter is in engagement with the crowned tooth face near the median plane of the latter, where the tooth form is substantially or nearly at right angles to the longitudinal axis of the chain. Accordingly, the cutter face ground on the raker 32d is near to or substantially at right angles to the longitudinal direction line of the chain. The raker 32d will be seen to be on one side of the median plane of the chain, and a second raker, not shown, will be understood to lie on the opposite side of this median plane, and to be ground with a substantially right angle leading edge by the portion of the tooth 30 immediately adjacent to the median plane, where the contour of the crowned tooth face is close to a right angle to the median plane. Accordingly, as desired, outward bevels are ground, sharpened, and honed onto the leading edges of the side cutters, and leading edges at close to or substantially at right angles to the longitudinal direction line of the chain are formed on the rakers, as desired. The provision of these leading cutting edges on the side cutters and rakers by the crowned profile of the tooth faces accounts for the fact that the side cutters are made somewhat longer than the rakers.

In the operation of sharpening a saw chain, the sharpener mounting arm 12 is moved, from its phantom line position in FIG. 1, to its full line position, the gear teeth 30 being properly meshed with the cutters of the chain. The saw chain is then driven, and the abrasive gear 24 thus caused to rotate. The cutting edges of the saw chain cutters are thereby sharpened on their leading edges by the rubbing action against the faces of the abrading teeth 30. It will be evident that, optionally, the gear can be power driven, and the chain then propelled by the gear. This option obviously requires operation of both the gear and the chain in the reverse direction.

During the sharpening operation, the gear 24 is preferably oscillated through a small angle on its trunnion axis by means of the handle 28. This axis, it will be seen, passes through a diameter of the gear, in the median plane thereof, and passes also generally in the direction of the pitch point P, so the teeth can rock thereabout without losing their necessary relationship to the cutters. Thus the crowned surfaces of the abrasive gear teeth are worked laterally across the faces of the cutters being ground, resulting in continuous dressing of the abrading surfaces of the gear teeth, and also in avoiding the wearing of grooves into the abrading surfaces. This feature is preferably employed; but the trunnion mounting may be dispensed with, the median plane of the gear being then fixed to coincide with the median plane of the saw chain.

The sharpening operation may be continued in this way until the cutters are sufficiently sharpened, whereupon the sharpening gear is disengaged by elevating the arm 12 until said gear is moved out of mesh with the cutters. As an alternative, however, a sharpening gear, made preferably of material of low abrasion characteristics, as simply of hard steel, can be operated at all times in mesh with the cutters, in which case, by leaving them in mesh with the cutters, they have a continuing honing action on the cutters, keeping them honed to a fine, sharp edge at all times.

Figure 4:
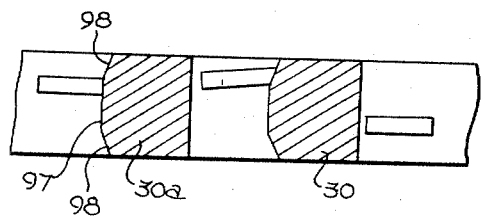
FIG. 4 is a view similar to a portion of FIG. 3, but showing a modification.

FIG. 4 shows a modification of the crowned type gear tooth which can be used in the apparatus of FIGS. 1–4 or 5. The tooth 30a in this case has a central or medial tooth face portion 97 at right angles to the chain, as well as laterally in parallelism with the axis of the gear, flanked by laterally beveled surfaces 98, the former for sharpening the rakers, and the latter for sharpening the side cutters. The laterally bevelled surfaces 98 will be seen to be at opposite acute angles to the axis of the gear. It will be seen that the crowned tooth face form of FIG. 3 and the bevelled tooth face form of FIG. 4 are equivalent, in that the medial regions of both, in the directions laterally thereacross, are substantially parallel to the axis of the gear, and in that the portions of the crowned tooth faces (FIG. 3) engaged by the bevelled side cutters, as well as the bevelled portions 98 (FIG. 4) engaged by the side cutters, are at opposite acute angles to the axis of the gear.

It is also feasible to use the sharpener of the present invention on a straight or rectilinear run of the cutter teeth, in a portion thereof where the links are running on the saw bar, as for example, just adjacent to the drive sprocket. It is of course possible to permanently mount the sharpening gear of the invention in a convenient location on the chain saw, as for example in the arrangement illustrated in FIGS. 1 and 2. Alternatively, however, the abrasive sharpener gear of the invention can be attached to the saw chain only when the sharpening operation is to be performed, and for such purpose, I may elect to position the sharpener gear where it can operate on a rectilinear run of the chain, as long the saw bar, in some position where it cannot conveniently be left during work with the chain saw. The sharpener may, alternatively, be positioned to operate on the chain going around the nose of the saw bar.

In FIG. 5, a saw chain 34a is illustrated and it is shown as riding on a saw bar 100, formed with the usual slot, as indicated at 102, for reception of the center link roots 38, the side links 35 of the chain riding on the upper edges of the saw bar in the conventional manner. This saw chain may be like the chain of FIGS. 1 and 1a excepting for omission of cutters on the center links. The same order of side cutters and rakers may however be used.

Meshing with the cutters of the saw chain in FIG. 5 are the gear teeth 30' of a spur gear 24'. The teeth 30' are illustrated to be the same as the teeth 30 of the earlier described embodiment, though they are here shown as provided, at the inner margin of the tooth faces 88', with gullets 110. The cycloidal or involute tooth faces 88', in this case, are preferably designed to have a 0° pressure angle relative to the leading cutting edges of the chain saw cutters, as is feasible with a rack gear, it being appreciated that the saw chain, running in the rectilinear path of FIG. 5, may be treated similarly to a rack gear. With such a 0° pressure angle, the upper corner of the lefthand cutter, as seen in FIG. 5, is just entering into engagement with the outer extremity of the gear tooth face 88'. A small pressure angle is feasible. If this angle $\alpha$ is as great as 5°, it lies as placed in FIG. 5, and the chain cutter then enters into engagement with the extremity of the tooth face at the point C. As well illustrated in FIG. 5, when the cutter at the lefthand edge of the view is in partial engagement with the face of the corresponding gear tooth, the cutter next ahead is still in engagement with its corresponding gear tooth, and this cutter and gear tooth clear or part in a position slightly beyond that illustrated in FIG. 5.

It will be noted that in the embodiment of FIG. 5, the pitch circle 112 of the gear 24' is tangent to the rectilinear pitch line 114 of the saw chain cutters, the point of tangency being the pitch point P. Again, as with the earlier described embodiment, the operative surfaces of the gear teeth are at addendum regions thereof, while the operative regions of the cutting edges of the saw chain cutters represent the dedendums of a rack gear.

The sharpener of the invention provides a unique means for sharpening the leading cutting edges of saw chain cutters, particularly of the scratcher chain type, and permits these edges to be sharpened accurately and with great convenience while the saw chain is running on the chain saw. The cutters gradually wear back, and are therefore preferably made long enough and of appropriate original positions to withstand substantial wear and consequent shortening. The use of the interengaging formations on the ends of the side links assures that the side links will preserve their predetermined path of travel with good accuracy, either around the sprocket or along the saw bar, so that a high degree of uniformity of sharpening is attainable. Attention is drawn to the fact that even very close spaced cutters, such as shown in FIG. 1, are capable of being sharpened by the device of the present invention, in view of the fact that when the cutters spread apart, in going around the sprocket, the spaces between cutters open up to accept the gear teeth. The modified chain of FIG. 5, in which the center links do not carry cutters, can be readily sharpened along a rectilinear line, without being thus spread apart, as is clearly evident from FIG. 5.

It will be understood that the drawings and description are for illustrative purposes only, and that various changes in design, construction, and arrangement may be made without departing from the scope of the present invention or of the appended claims.

I claim:
1. The combination of a saw chain and sharpener therefor, that includes:
   a chain saw comprising a succession of pivotally connected links;
   elongated cutters directed generally longitudinally of the chain on at least some of said links, with front cutting edges located thereon between the pivots of the links;
   a rotatable gear having teeth with abrading tooth faces; and
   means supporting and guiding the links of said chain so that the cutters thereon mesh and run with the teeth of said gear along a predetermined path, with the pitch circle of said gear and the line of travel of the outer extremities of the cutting edges of said cutters substantially tangent to one another, in such manner that the cutting edges of said cutters engage and slide on said abrading tooth faces of said gear teeth.
2. The subject matter of claim 1, wherein the tooth faces of said gear teeth have substantially cycloidal profiles.
3. The subject matter of claim 1, wherein said cutters engage said gear teeth only outside the pitch circle of said gear.
4. The subject matter of claim 2, wherein said cutters engage said gear teeth only outside the pitch circle of said gear.
5. The subject matter of claim 1, wherein the line of travel of the outer extremities of the cutting edges of the cutters is a circular arc tangent to the pitch circle of said gear.
6. The subject matter of claim 1, wherein the line of travel of the outer extremities of the cutting edges of the cutters is a straight line tangent to the pitch circle of said gear.
7. The subject matter of claim 1, wherein said tooth faces of said gear include a medial region running longitudinally along the tooth faces, said medial region being laterally substantially parallel with the axis of the gear at the medial plane of the gear, and an adjacent abrasive tooth face region spaced beyond said medial plane, which is laterally, effectively, at an acute angle to the axis of the gear, some of said cutters having front cutting edges longitudinally aligned with said acute angled region of said tooth face.
8. The subject matter of claim 7, wherein the tooth face has a crowned transverse profile.
9. The subject matter of claim 7, wherein the tooth face is oppositely bevelled on opposite sides of said medial region.
10. The subject matter of claim 1, wherein said tooth faces of said gear compirse tooth face regions on opposite sides of said medial plane which are at opposite acute angles laterally thereacross relative to the axis of the gear.
11. A system for sharpening longitudinally spaced leading cutter edges of side cutters on pivotally connected links for a saw chain, that comprises:
   a rotatable modified spur gear with teeth having abrading tooth faces meshing and running with the cutters of said saw chain, said tooth faces comprising tooth face regions spaced on opposite sides of a medial plane of the gear and which are at opposite acute angles laterally thereacross relative to the axis of the gear.
12. A system for sharpening longitudinally spaced leading cutter edges of side cutters on pivotally connected links for a saw chain, that comprises:
   a rotatable modified spur gear with teeth having abrading tooth faces meshing and running with the cutters of said saw chain, said teeth having faces formed with a crowned transverse profile.
13. A system for sharpening longitudinally spaced leading cutter edges of side cutters on pivotally connected links for a saw chain, that comprises:
   a rotatable modified spur gear with teeth having abrading tooth faces meshing and running with the cutters of said saw chain, said teeth having a central medial tooth face region which is laterally substantially parallel with the axis of the gear flanked by bevelled tooth face regions at opposite acute angles to the axis of the gear.
14. The subject matter of claim 12, including means mounting said gear to oscillate on a diameter thereof which extends generally toward the pitch point of the meshing gear and cutters.
15. The subject matter of claim 1, wherein the head and tail ends of each cutter-bearing link are interengageable with the respective tail and head ends of the immediately preceding and succeeding links to cause said chain to conform closely to said predetermined path in traveling therealong.

References Cited
UNITED STATES PATENTS 2,165,386   7/1939   Klomp _____ 51—287 XR BERNARD STICKNEY, Primary Examiner U.S. Cl. X.R.

51—95, 287; 76—25, 112